United States Patent
Jackson

(10) Patent No.: US 7,490,325 B2
(45) Date of Patent: Feb. 10, 2009

(54) SYSTEM AND METHOD FOR PROVIDING INTELLIGENT PRE-STAGING OF DATA IN A COMPUTE ENVIRONMENT

(75) Inventor: David Brian Jackson, Spanish Fork, UT (US)

(73) Assignee: Cluster Resources, Inc., Provo, UT (US)

( * ) Notice: Subject to any disclaimer, the term of this patent is extended or adjusted under 35 U.S.C. 154(b) by 119 days.

(21) Appl. No.: 10/589,339

(22) PCT Filed: Mar. 11, 2005

(86) PCT No.: PCT/US2005/008282

§ 371 (c)(1),
(2), (4) Date: Aug. 11, 2006

(87) PCT Pub. No.: WO2005/089236

PCT Pub. Date: Sep. 29, 2005

(65) Prior Publication Data

US 2007/0294197 A1 Dec. 20, 2007

Related U.S. Application Data

(60) Provisional application No. 60/552,653, filed on Mar. 13, 2004.

(51) Int. Cl.
*G06F 9/46* (2006.01)
*G06F 9/45* (2006.01)

(52) U.S. Cl. .............. 718/100; 718/102; 718/104; 718/107; 703/22

(58) Field of Classification Search .......... 718/100–108, 718/1; 709/226; 703/22
See application file for complete search history.

(56) References Cited

U.S. PATENT DOCUMENTS 6,041,354 A * 3/2000 Biliris et al. .............. 709/226
2003/0061261 A1* 3/2003 Greene ...................... 709/104

FOREIGN PATENT DOCUMENTS

WO  WO 98/58518  * 12/1998

OTHER PUBLICATIONS

Le, "The Data-Aware Resource Broker—A Resource Management Scheme for Data Intensive Applications", University of Adelaide, Nov. 2003, pp. 1-63.*
Volckaert et al., "On the Use of NSGRID for Accurate Grid Schedule Evaluation", Ghent University, Dept. of Information Tectnology, 2004, pp. 1-10.*

* cited by examiner

*Primary Examiner*—Meng-Ai An
*Assistant Examiner*—Jennifer N To
(74) *Attorney, Agent, or Firm*—Thomas M. Isaacson

(57) ABSTRACT

A system, computer-readable medium and method for performing intelligent data pre-staging for a job submitted to a cluster environment. The method aspect comprises determining availability of compute resources including availability timeframes to process the submitted job, determining data requirements for processing the job and determining a co-allocation in time reservation.

15 Claims, 3 Drawing Sheets

SYSTEM AND METHOD FOR PROVIDING INTELLIGENT PRE-STAGING OF DATA IN A COMPUTE ENVIRONMENT

PRIORITY CLAIM

The present application claims priority to U.S. Provisional Application No. 60/552,653 filed Mar. 13, 2004, the contents of which are incorporated herein by reference.

RELATED APPLICATIONS

The present application is related to U.S. patent application Ser. Nos. 10/530,583, which is now pending; Ser. No. 10/530,582 which is now pending; Ser. No. 10/530,582 which is now pending; Ser. No. 10/530,581 which is now pending; Ser. No. 10/530,577 which is now pending; Ser. No. 10/530,576 which is now pending; Ser. No. 10/530,578 which is now pending; Ser. No. 10/530,578 which is now pending; Ser. No. 10/530,580 which is now pending; and Ser. No. 10/530,575 which is now pending, filed on the same day as the present application. The content of each of these cases is incorporated herein by reference.

BACKGROUND OF THE INVENTION

1. Field of the Invention

The present invention relates to managing job submissions in a compute environment such as a cluster and more specifically to intelligent data just in time data pre-staging to optimize the use of diverse compute resources.

2. Introduction

The present invention relates to a system and method of allocation resources in the context of a grid or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring grid resources over time in order to run grid applications as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will comprise a plurality of clusters as will be shown in FIG. 1. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

An administrator can partition a cluster and identify a set of resources to be dedicated to a particular purpose and another set of resources can be dedicated to another purpose. In this regard, the resources are reserved in advance to process the job. To illustrate, an example is provided. Assume that the weather bureau needs to do a compute intensive hurricane analysis. They will desire to gather a large amount of stored data from disk and then process that data and store the resulting computed data. A scheduler, to manage the cluster resources for this job, will schedule the disks to retrieve the data, network routers with an appropriate bandwidth to transmit the data, computer processors to then process the data, and then network routers and data disks to transmit and store the computed data. The availability of the disks for these retrieval and storage aspects of the job may not overlap specifically in time with the time for the availability of the computer processing or transmission resources.

To manage the jobs submissions, a cluster scheduler will employ reservations to insure that jobs will have the resources necessary for processing. FIG. 1B illustrates a cluster/node diagram for a cluster 124 with nodes 120. Time is along the X axis. Node 1 has a reservation on it and an access control list (ACL) 122 which is static. The ACL 122 is based on the credential available to the requestor or person submitting the job. In other words, the user, group, the account, the class or quality of service the requestor has and/or is asking for. The job either will get onto the ACL 122 based on the criteria or it won't. That determination is made at the time the job is submitted for entry on the ACL 122.

The approach described above for reserving and processing jobs utilizing the various cluster resources has drawbacks in efficiency. The retrieved data from the disk storage resource may not coincide with the computer processing resources. In other words, the data may be retrieved from disk but the computer processors may not be ready to process the data given the other jobs submissions that are operating within their reservations on the cluster resources. To improve the management of cluster resources, what is needed in the art is an improved method for managing the consumption of diverse resources within a compute environment such as a cluster or grid.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

A system and method for performing intelligent data pre-staging for a job submitted to a cluster environment. The method aspect comprises determining availability of compute resources including availability timeframes to process the submitted job, determining data requirements for processing the job and determining a co-allocation in time reservation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention applies to a compute environment examples of which include clusters and grids. It is preferable that is be used to manage cluster resources but there is no requirement that it be limited to that context. The cluster may be part of a data center, host facility, virtual hosting center, utility-based computing environment and so forth. The present invention applies to any scenario where there is a need for compute resource guarantees with time offsets. In other words, a hosting center may have a service level agreement with a company to provide a certain amount of compute resources within two hours of a request for resources.

The particular scenario where the invention applies is where a job submission requires a staging of data, which typically involves retrieving the data from disk and storing the data in a cache in preparation for compute resources to become available to process the data. In the cluster environment, the compute resources will be processing other jobs and the data staging is to enable the compute resources to finish other prior commitments and be ready to process the job associated with the staged data.

The invention comprises a system, method and computer-readable media for performing a data pre-staging to analyze the resources and the data to reduce any wasted resources when diverse resources such as storage disks, cache, compute resources, and transmission bandwidth must all be reserved and used to complete a job. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed.

Figure 1A:
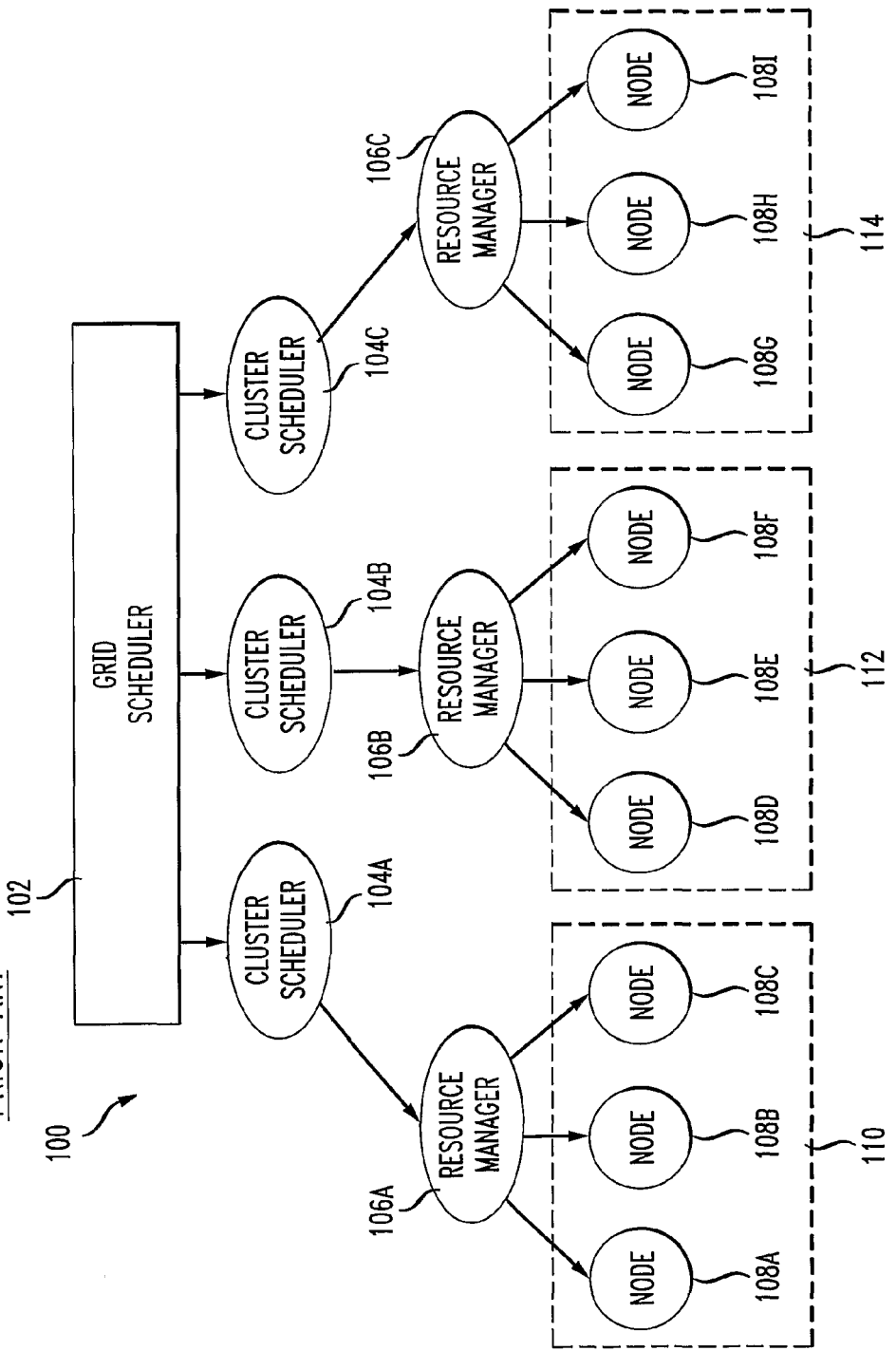
FIG. 1A illustrates generally a grid scheduler, cluster scheduler, and resource managers interacting with compute nodes.
Figure 1B:
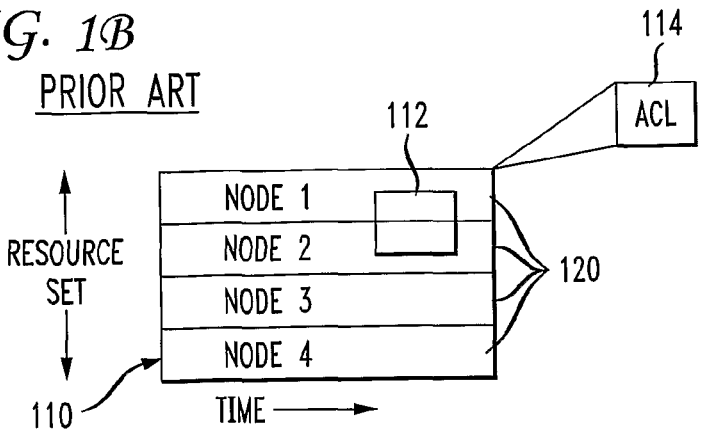
FIG. 1B illustrates an access control list controlling access to a group of nodes within a cluster environment.
Figure 2:
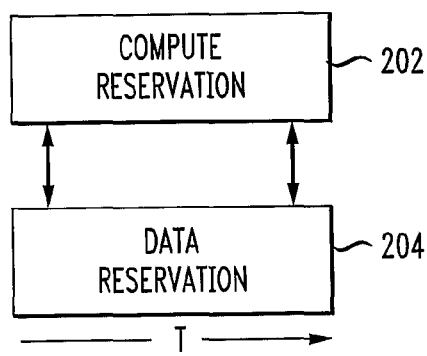
FIG. 2 illustrates the interaction between a compute reservation and a data reservation.

FIG. 2 illustrates an ideal interaction between compute resources 202 and data resources 204. Time is along the x axis in this figure. This interaction is mentioned as being ideal because what is illustrated in FIG. 2 is the scenario where the compute reservation of resources (node processors or other compute resources) and the data resources (such as storage disks) are both concurrent in time. In this case, since the reservations of resources span the same time frame, the resources are always available for each other for job processing. In other words, if the compute nodes need data at any time during the processing of a job, the data resources will always be reserved and available for providing the data stage-in or data stage-out necessary. This is not always the most efficient use of resources, however.

Figure 3:
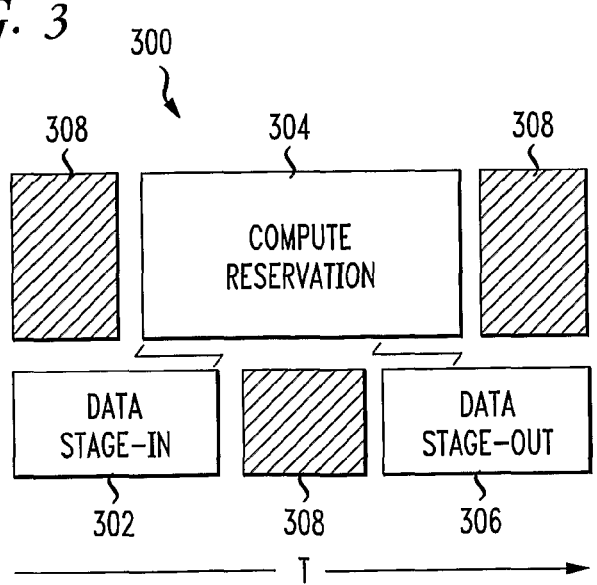
FIG. 3 illustrates the data stage-in process and data stage-out process with a compute reservation.

FIG. 3 illustrates an aspect of the invention wherein the data stage-in reservation is made 302 earlier in time to the compute reservation 304. Other compute reservations exist 308 before and after the current reservation. The data stage-in reservation of data resources is timed to overlap the compute reservation an appropriate amount of time to provide the necessary data to the compute resources for processing the job. Then the data resources are reserved for another entity 310 since these resources will not be needed until the data stage-out reservation 306 which may involve, for example, receiving the processed data from a weather analysis of a hurricane. FIG. 3 illustrates a more advanced and efficient use of resources.

Figure 4:
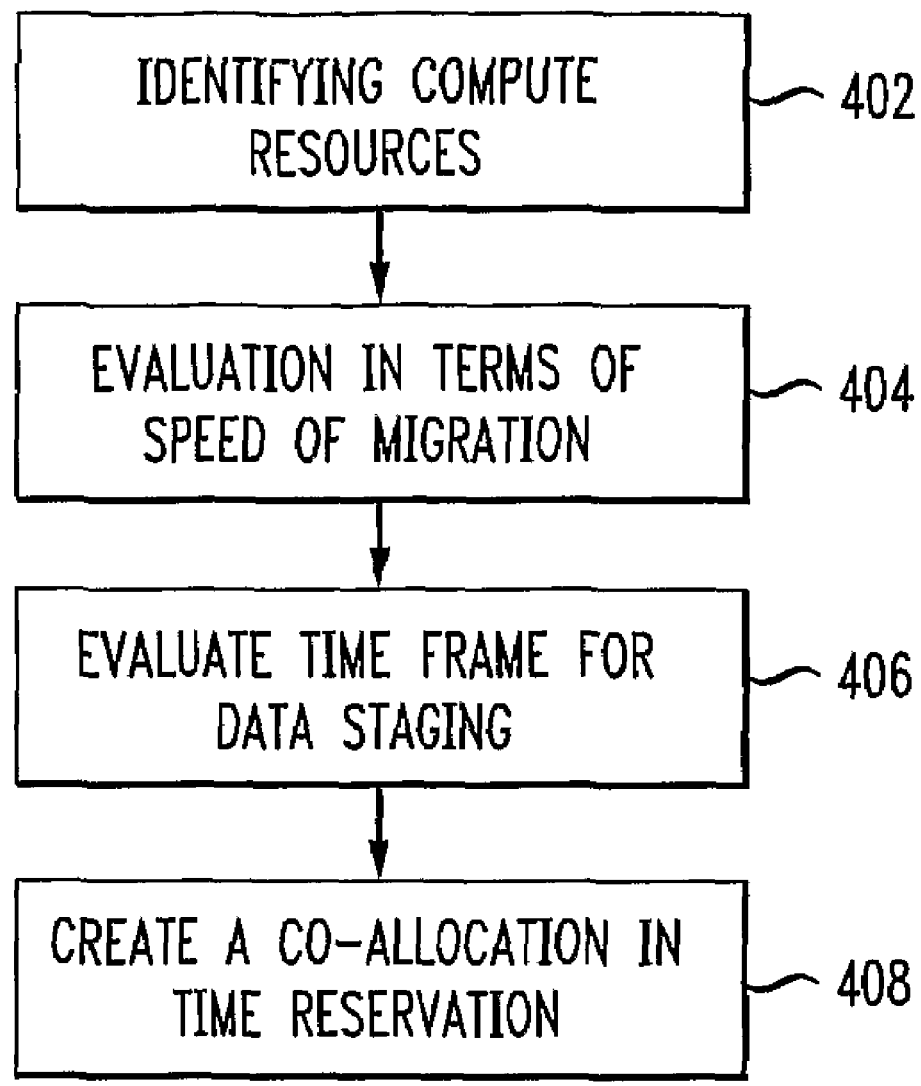
FIG. 4 illustrates a method aspect of the present invention.

With the principles in mind above, the steps of the invention will be explained next with reference to FIG. 4. The method may be performed by a cluster scheduler, of grid scheduler, or other software component associated with the management of resources in the cluster environment. Therefore, any of these components may be considered the "system" that performs the steps of the method embodiment of the invention.

A reservation of resources is made or a job is submitted for processing on the cluster. In order to actually do intelligent data pre-stage and co-allocation of resources and time, the first step in intelligent data pre-stage is the analysis of time to stage data. The system must determine how long it's going to take the complete the particular task by estimating that timeframe based on network information, network speed, faults, statistical fluctuation, delivered bandwidth by the network, size, and any issues, the system basically ramps up the initialize step, a data transfer step, and a prologue step or a termination step completes the record and verifies the successful transfer of data. In this regard, the method includes identifying compute resources to process the job and locating various timeframes in which those resources have availability (402). This is the first step related to the compute resources. The system evaluates the data requirements and resources that the job would consume in terms of quantity of data and in terms of speed of migration of that data (404). This is the second step related to the data and network resources. Once the rate, of data transfer is identified, the system determines the timeframe by which the data staging would need to make it available (406). The goal is to maximize the timing of the allocation of resources between-the network bandwidth, the data cache or disk usage, and the compute resources. The allocation of the data cache and network bandwidth occurs earlier in time followed by the compute resources. There also is likely some data caching or bandwidth needs for post-processing transmission and storage of data.

For an input file, one could optimize resources by releasing the data resources after some time into the job once the job has successfully loaded all that information into memory. Whether or not that's actually done would depend on how highly constrained the data resources were. Basically, there would be a requirement to start a data stage and some time offset from when the compute cycle begins. Sometime after that compute cycle is over, the system allocates another data stage for stage back or transmission of the processed data.

The present invention improves the efficiency of the data in-gathering stage where those resources are not wasted by the mis-timing of the gathering and processing resources. The invention involves timing the gathering of data with the availability of compute resources to process the data. Typically, the compute resources are most constrained by reservations, which enable an administrator to over constrain data and network resources without an overall impact on utilization.

Next, the system performs a series of calculations to evaluate existing resource guarantees and reservations already in place to create a range list. A range list indicates all the availability time frames. With all the available time frames, the system calculates, based on incorporated duration information and the availability time frames information, which available time frames the request could actually start. For example, if one had resources available for a period of two hours and had a request that lasted one hour, the time during which that request could start is only during the first hour of that availability.

The system converts the availability range to a start range and once that completes, the system then performs the same evaluation for the second request in which the system performs the same process independently to evaluate when resources are available and converts that availability information into start information. This process may occur for any number of n requests. The various requests may relate to different types of resources. For example, one request may be processed for compute resources and another request for data resources, provisioning resources or bandwidth resources etc.

Once all the requests have been converted to start ranges, the system shifts the start ranges by the offset and performs an intersection operation (an AND operation) on the combination start range. With the intersection, the system shifts it back by the negative of the offset, wherein the resulting information provides when to start each reservation. Like any intersection operation, there will probably be multiple viable solutions that the system presents to the external system making the requests. The system could present the solutions as a number of start time availabilities. Once a start time is selected by an administrator or user, the system shifts everything back and reserves the resources during those time frames.

Once the system completes the time estimate and performs the steps as set forth above, the method includes creating a co-allocation in time reservation (408). The key to this process is determining a number of calculations based on: (1) the duration and quantity of the first compute resources, (2) the duration and quantity of the second data and network bandwidth resources, (3) the fact that the second step must complete prior to the beginning of first step, (4) the job execute, within certain constraints, (5) the offset time. With this information, the system performs a co-allocation reservation in which the system requests the resources for whatever the first step in time is. So in this case, the system determines the information for the data migration.

Within the workload manager of the present invention, the system can actually pass back transaction IDs associated with a co-allocation in time reservation. The transaction ID can then be used as a reference to the particular analysis or resulting reservation. So when a user submits a query they can have a concept of a transaction ID associated with that query. The transaction ID indicates that a person has this particular query subject to certain constraints and they know there is a certain block of resources available. They can mask the specifics of the query and if they want to come back and get these resources they simply indicate that they would like to commit the particular transaction under the covers, once all the resources are done.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, macroprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A computer-implemented method of performing intelligent data pre-staging for a job submitted to a compute environment, the method comprising:
   determining availability of compute resources in a cluster or grid environment including availability timeframes of the compute resources to process the submitted job;
   determining data requirements for processing the job;
   determining a co-allocation in time reservation by:
   (1) requesting resources for a first step in the job process based on the determined availability and/or the determined data requirements;
   (2) calculating existing resource guarantees and reservations already in place to create an availability range list;
   (3) converting the availability range list into a start range list;
   (4) requesting another resource for a next step in the job process and returning to step (2) until all resources for all steps in the job process are requested;
   (5) shifting start ranges in the start range list by an offset and performing an intersection operation on a combination start range;
   (6) shifting the start ranges back by a negative of the offset, wherein resulting information provides when to start each reservation;
   (7) presenting to a user a final list of selectable starting times for a reservation; and
   (8) upon receiving a user selection of a reservation start time, establishing a co-allocation in time reservation for resources for an appropriate start time; and
   performing data pre-staging based on the co-allocation in time reservation and prior to processing the job in the compute environment.

2. The computer-implemented method of claim 1, wherein the data requirements relate to a quantity of data and a speed of migration of the data to the compute resources.

3. The computer-implemented method of claim 1, wherein the data requirement for processing the job are at least one of: network information, network speed, faults, statistical fluctuation, delivered bandwidth by the network and size.

4. The computer-implemented method of claim 1, wherein the compute resources must be available prior to the completion of data pre-staging.

5. The computer-implemented method of claim 1, wherein the range list indicates all the availability time frames.

6. A system for performing intelligent data pre-staging for a job submitted to a compute environment, the system comprising:
   a processor;
   a module configured to control the processor to determine availability of compute resources in a cluster or grid environment including availability timeframes to process the submitted job;
   a module configured to control the processor to determine data requirements for processing the job;
   a module configured to determine a co-allocation in time reservation, the module determining the co-allocation in time reservation by:
   (1) requesting resources for a first step in the job process based on the determined availability and/or the determined data requirements;
   (2) calculating existing resource guarantees and reservations already in place to create an availability range list;
   (3) converting the availability range list into a start range list;
   (4) requesting another resource for a next step in the job process and returning to step (2) until all resources for all steps in the job process are requested;
   (5) shifting start ranges in the start range list by an offset and performing an intersection operation on a combination start range;
   (6) shifting the start ranges back by a negative of the offset, wherein resulting information provides when to start each reservation;
   (7) presenting to a user a final list of selectable starting times for a reservation; and
   (8) upon receiving a user selection of a reservation start time, establishing a co-allocation in time reservation for resources for an appropriate start time; and
   a module configured to control the processor to perform data pre-staging based on the co-allocation in time reservation and prior to processing the job in the compute environment.

7. The system of claim 6, wherein the data requirements relate to a quantity of data and a speed of migration of the data to the compute resources.

8. The system of claim 6, wherein the data requirement for processing the job are at least one of: network information, network speed, faults, statistical fluctuation, delivered bandwidth by the network and size.

9. The system of claim 6, wherein the compute resources must be available prior to the completion of data pre-staging.

10. The system of claim 6, wherein the range list indicates all the availability time frames.

11. A computer-readable medium containing instructions for controlling a computing device to perform intelligent data pre-staging for a job submitted to a compute environment, the instructions comprising:

determining availability of compute resources in a cluster or grid environment including availability timeframes of the compute resources to process the submitted job;

determining data requirements for processing the job;

determining a co-allocation in time reservation by:
  (1) requesting resources for a first step in the job process based on the determined availability and/or the determined data requirements;
  (2) calculating existing resource guarantees and reservations already in place to create an availability range list;
  (3) converting the availability range list into a start range list;
  (4) requesting another resource for a next step in the job process and returning to step (2) until all resources for all steps in the job process are requested;
  (5) shifting start ranges in the start range list by an offset and performing an intersection operation on a combination start range;
  (6) shifting the start ranges back by a negative of the offset, wherein resulting information provides when to start each reservation;
  (7) presenting to a user a final list of selectable starting times for a reservation; and
  (8) upon receiving a user selection of a reservation start time, establishing a co-allocation in time reservation for resources for an appropriate start time; and performing data pre-staging based on the co-allocation in time reservation and prior to processing the job in the compute environment.

12. The computer-readable medium of claim 11, wherein the data requirements relate to a quantity of data and a speed of migration of the data to the compute resources.

13. The computer-readable medium of claim 11, wherein the data requirement for processing the job are at least one of: network information, network speed, faults, statistical fluctuation, delivered bandwidth by the network and size.

14. The computer-readable medium of claim 11, wherein the compute resources must be available prior to the completion of data pre-staging.

15. The computer-readable medium of claim 11, wherein the range list indicates all the availability time frames.

* * * * *